(12) United States Patent
Weiss et al.

(10) Patent No.: US 12,043,128 B2
(45) Date of Patent: Jul. 23, 2024

(54) CONDUCTIVE CHARGER WITH CONTACTS

(71) Applicants: HIRSCHMANN AUTOMOTIVE GMBH, Rankweil/Brederis (AT); BAYERISCHE MOTOREN WERKE AKTIEN-GESELLSCHAFT, Munich (DE)

(72) Inventors: Marco Weiss, Rankweil (AT); Werner Jaeger, Hohenems (AT); Bernhard Hoess, Munich (DE); Manfred Holzmann, Munich (DE); Alexander Ewald, Munich (DE)

(73) Assignees: HIRSCHMANN AUTOMOTIVE GMBH, Rankweil/Brederis (AT); BAYERISCHE MOTOREN WERKE AG, Munich (DE)

( * ) Notice: Subject to any disclaimer, the term of this patent is extended or adjusted under 35 U.S.C. 154(b) by 525 days.

(21) Appl. No.: 17/287,024

(22) PCT Filed: Oct. 31, 2019

(86) PCT No.: PCT/EP2019/079828
§ 371 (c)(1),
(2) Date: May 8, 2021

(87) PCT Pub. No.: WO2020/089392
PCT Pub. Date: May 7, 2020

(65) Prior Publication Data
US 2021/0323423 A1 Oct. 21, 2021

(30) Foreign Application Priority Data
Oct. 31, 2018 (DE) ..................... 10 2018 127 173.5

(51) Int. Cl.
*B60L 53/16* (2019.01)
*B25J 15/00* (2006.01)
(Continued)

(52) U.S. Cl.
CPC ........... *B60L 53/16* (2019.02); *B25J 15/0019* (2013.01); *B25J 19/0033* (2013.01); *B60L 53/35* (2019.02);
(Continued)

(58) Field of Classification Search
CPC ...... B60L 53/16; B60L 53/35; B60L 2260/32; B25J 15/0019; B25J 19/0033;
(Continued)

(56) References Cited

U.S. PATENT DOCUMENTS

| 7,999,506 | B1 * | 8/2011 | Hollar | ..................... B60L 53/34 320/109 |
| 9,056,555 | B1 * | 6/2015 | Zhou | ....................... B60L 53/35 |

(Continued)

FOREIGN PATENT DOCUMENTS

| CN | 201263019 A | 6/2009 |
| EP | 1679474 A | 7/2006 |

(Continued)

*Primary Examiner* — Nha T Nguyen
(74) *Attorney, Agent, or Firm* — Andrew Wilford (57) ABSTRACT

An apparatus for conductive charging has a vehicle part fixed on a vehicle and a fixed robot part movable relative to the vehicle part the parts being fittable together for charging. Respective sets of vehicle and robot contacts are provided in housing the robot and vehicle parts. The robot contacts in the robot part are recessed in the housing of the robot part and the vehicle contacts are nonmovably mounted in the housing of the vehicle part. A robot base carries the robot contacts of the robot part. A contact tab extends from the robot base. A vehicle base carries the contacts of the vehicle part and is formed by a plurality of base sections surrounding a cylindrical sleeve. A contact spring extends from between two of the base sections of the vehicle base.

8 Claims, 7 Drawing Sheets

(51) Int. Cl.
*B25J 19/00* (2006.01)
*B60L 53/35* (2019.01)
*H01R 13/453* (2006.01)
*H01R 24/38* (2011.01)
*H01R 43/26* (2006.01)
*H02J 7/00* (2006.01)
*H01R 107/00* (2006.01)

(52) U.S. Cl.
CPC ......... *H01R 13/4538* (2013.01); *H01R 24/38* (2013.01); *H01R 43/26* (2013.01); *H02J 7/0042* (2013.01); *H01R 2107/00* (2013.01); *H01R 2201/26* (2013.01)

(58) Field of Classification Search
CPC .... H01R 13/4538; H01R 24/38; H01R 43/26; H01R 2107/00; H01R 2201/26; H02J 7/0042; Y02T 10/70; Y02T 10/7072; Y02T 90/12; Y02T 90/14
See application file for complete search history.

(56) References Cited

U.S. PATENT DOCUMENTS

| | | | | |
|---|---|---|---|---|
| 9,327,607 | B2* | 5/2016 | Oh | B60L 53/35 |
| 9,815,377 | B2* | 11/2017 | Wu | B60L 53/65 |
| 10,008,815 | B2 | 6/2018 | Flechl | |
| 10,279,696 | B2* | 5/2019 | Dow | B60L 53/65 |
| 10,286,799 | B2* | 5/2019 | Namou | B60L 53/30 |
| 11,077,764 | B2* | 8/2021 | Corfitsen | B60L 53/18 |
| 11,279,253 | B2* | 3/2022 | Flechl | B60L 53/30 |
| 11,502,456 | B2* | 11/2022 | Klausner | B60L 53/36 |
| 11,745,612 | B1* | 9/2023 | Ocampo Villegas | H01M 10/6554 429/120 |
| 2010/0173534 | A1 | 7/2010 | Tung | |
| 2011/0066515 | A1* | 3/2011 | Horvath | B60L 53/36 705/17 |
| 2011/0077809 | A1* | 3/2011 | Leary | B60L 53/14 320/109 |
| 2013/0076902 | A1* | 3/2013 | Gao | B60L 53/31 348/148 |
| 2013/0249470 | A1* | 9/2013 | Martin | B60L 53/12 320/107 |
| 2014/0176070 | A1* | 6/2014 | Krammer | H02J 7/00 320/109 |
| 2014/0333261 | A1* | 11/2014 | Oh | B60L 53/65 320/109 |
| 2015/0042278 | A1* | 2/2015 | Leary | B60L 1/02 901/30 |
| 2016/0280087 | A1* | 9/2016 | Tajima | B60L 53/18 |
| 2016/0332525 | A1* | 11/2016 | Kufner | B60L 53/16 |
| 2017/0166070 | A1* | 6/2017 | Dunger | B60L 53/11 |
| 2017/0225578 | A1* | 8/2017 | Paryani | B60L 53/36 |
| 2017/0349055 | A1* | 12/2017 | Kilic | B60L 53/35 |
| 2018/0001777 | A1* | 1/2018 | Kilic | B60L 53/68 |
| 2018/0015836 | A1* | 1/2018 | Madon | B60L 53/18 |
| 2018/0029487 | A1* | 2/2018 | Murai | B60L 50/60 |
| 2018/0056799 | A1* | 3/2018 | Namou | B60L 58/20 |
| 2018/0086219 | A1* | 3/2018 | Malek | B60L 53/305 |
| 2019/0016218 | A1* | 1/2019 | Haag | H02J 50/10 |
| 2023/0278444 | A1* | 9/2023 | Bartels | B60L 53/35 320/109 |

FOREIGN PATENT DOCUMENTS

| | | |
|---|---|---|
| EP | 2595252 A | 5/2013 |
| WO | 2016119000 A | 8/2016 |

* cited by examiner

Temperature sensor

Disengaged Position

Fig. 7A

Actuation of Engagement Guard

Fig. 7B

Charging

CONDUCTIVE CHARGER WITH CONTACTS

CROSS REFERENCE TO RELATED APPLICATIONS

This application is the US-national stage of PCT application PCT/EP2019/079828 filed 31 Oct. 2019 and claiming the priority of German patent application 102018127173.5 itself filed 31 Oct. 2018.

FIELD OF THE INVENTION

The invention relates to an apparatus for conductive charging, in particular of electric vehicles at a base station and having a vehicle part that is fixed on the vehicle and a robot part that is limitedly movable there, vehicle part engaging with the robot part for charging, and the two parts each having a housing holding a respective set of contacts with the contacts in the robot part being recessed in the housing of the robot part and the contacts of the housing being nonmovably mounted in the housing of the vehicle part.

BACKGROUND OF THE INVENTION

WO 2016/119001 A1 has already disclosed a plug connection for connecting in particular electrical lines for the purposes of conductive charging, comprising at least one female connecting element and one male connecting element, the female connecting element receiving the male connecting element in positively locking fashion and the two connecting elements, in the case of positively locking contact, being releasably connectable in non-positively locking fashion, and a connecting region of the male connecting element being designed to taper coaxially and comprises at least one displaceable contact body that, in a first position, is arranged within and, in a second position, is arranged so as to project out of, the male connecting element. With the apparatus described in this international patent application, conductive charging, in particular of electric vehicles, is possible at a base station. One connecting element is arranged on the autonomously driving vehicle, whereas the other connecting element is arranged in a fixed position but so as to be movable there within certain limits. If the vehicle moves with its connecting element in the direction of the static connecting element, these two connecting elements are placed in operative connection with one another in that, for electrical contacting, the respective contact bodies of the two connecting elements are placed in connection with one another such that the charging current can then flow.

In the case of this prior art, however, the contact elements (contact bodies) of the male connecting element are arranged movably in this male connecting element. In a first position, they are arranged entirely within the male connecting element, such that these contact bodies are protected against touching and contamination. Only when the two connecting elements have been brought together does the contact body, which was previously situated within the connecting element, move out of the male connecting element, such that these contact bodies can be placed in contact with the respective contact bodies of the female connecting element.

The invention thus relates to an improved apparatus for conductive charging. Conductive charging is to be understood to mean that the electrical contacts of a base station, at which charging energy is made available, are placed in operative connection with electrical contacts of an autonomously driving vehicle such that they touch one another for the purposes of charging. This conductive charging has the advantage over likewise known inductive charging, which takes place contactlessly, of significantly greater energy transmission, such that autonomous vehicles are much more quickly charged and ready for operation again.

For the apparatus for conductive charging as a whole, a vehicle part is provided that is arranged on the vehicle, in particular on the electric vehicle. Independently, and at an arbitrary other location, a robot part is provided that can be actuated by the vehicle for the purposes of charging. The robot part is therefore in a fixed position but is movable within certain limits at the location where charging is to take place. The purpose of this is that the vehicle with its vehicle part does not have to perform actuation whilst overlapping the robot part percent, but rather the robot part locates the vehicle part when the vehicle has been parked for the purposes of charging.

OBJECT OF THE INVENTION

Proceeding from this, the object of the invention is to improve the contacts both on the vehicle part and on the robot part of the apparatus for conductive charging.

SUMMARY OF THE INVENTION

According to the invention the at least one contact of the robot part has a base from which a cylindrical sleeve and a contact tab extend, and the at least one contact of the vehicle part has a base from which at least one contact spring and one contact tab extend. By means of the base of the contact of the robot part, a stiffness of said contact is attained, which is additionally increased by the cylindrical sleeve that projects from the base. The cylindrical sleeve in turn forms a sufficiently large contact surface for the at least one contact, preferably for the multiple contacts of the robot part. This provides robust contact and a high level of operational reliability. This is additionally further increased in that the at least one contact of the vehicle part has the base from which at least one contact spring, again preferably multiple contact springs, extend(s). This eliminates the disadvantage of the prior art, in which the contacts of the male and of the female connecting element abut against one another fully areally in encircling fashion. This gives rise to high friction, which makes both the contacting and the mutual centering more difficult. As a result of the abutment or connecting of the at least one contact spring of the contact of the one part with as large a contact surface as possible, which is formed by the cylindrical sleeve, the contacting is improved, in particular by way of a punctiform or small sectional contact surface, and furthermore, the friction during the bringing-together of robot part and vehicle part is minimized.

In addition, it is self-evident that each contact has at least one contact tab, preferably exactly one contact tab that can connect the respective contact via downstream lines, possibly with the interposition of plug connections, to a controller and/or an energy source for the purposes of charging and/or the like.

In a refinement of the invention, it is provided that the cylindrical sleeve has at least one recess, preferably multiple recesses arranged around the circumference of the cylindrical sleeve. The at least one recess or the multiple recesses arranged around the circumference of the cylindrical sleeve have the advantage, in this way, that the stiffness of the cylindrical sleeve is locally reduced somewhat in order to allow play compensation when the contact of the robot part is brought together with the respective contact of the vehicle part. It is self-evident here that the contact, in particular a contact spring, of the vehicle part is guided not into the region of a respective recess but into a region of the cylindrical sleeve adjacent to a respective recess, and abuts there for the purposes of contacting.

In a refinement of the invention, it is provided that the base of the contact is formed by multiple base sections arranged around the circumference, wherein a contact spring projects perpendicularly between in each case two base sections. A geometrical embodiment of this contact is thus provided that can highly effectively be produced in automated fashion and in high part quantities and thus with reduced costs in a known stamping-bending process or a known stamping-rolling process or a combination of these two processes.

In a refinement of the invention, it is provided that the contact spring has an angled portion at its free end. On the one hand, the connection of the contact spring to the base of this contact creates a certain flexibility in order to compensate for tolerances and, above all, to facilitate the centering during the bringing-together of vehicle part and robot part. This facilitation of the centering and also the increase of the contact force is further improved by virtue of the contact spring having an angled portion at its free end. This advantageous facilitation is achieved in particular if the angled end of the intrinsically free end of the contact spring is situated with a spacing, in particular a plane-parallel spacing, to the base section of the contact spring. Thus, a spring force is attained not only by the contact spring projecting, preferably perpendicularly, from the base but also by means of the angled portion of the end section of the contact spring at its free end.

The contact elements of the robot part are recessed in a housing and thus so as to be protected against external touching or contamination, but are accessible to the contact elements of the vehicle part. The contact elements of the vehicle part must likewise be protected against touching or contamination. For this purpose, according to the invention, the contact elements of the vehicle part are covered by an engagement guard such that the contact elements of the vehicle part are not accessible for as long as no charging is being performed and for as long as the vehicle part has not been placed in operative connection with the robot part. Only when the robot part is moved in the direction of the vehicle part is this engagement guard moved relative to the housing of the vehicle part by the robot part such that the contact elements of the vehicle part, which are nonmovably mounted in the housing of the vehicle part, are exposed and can engage into the corresponding free spaces in the robot part in order to touch and thus make contact with the contact elements, situated there, of the robot part. For this purpose, the engagement guard is supported on the housing of the vehicle part via springs. This configuration has the significant advantage that the engagement guard, as a mechanical component, is moved relative to the housing of the vehicle part, whereas the contact elements of the vehicle part are nonmovably mounted in said vehicle part, because, in practice, a movable mechanical component (without electrical function) can be much more effectively implemented than an electrically conductive component that, in the case of the prior art, not only serves for the electrical contacting but must simultaneously also be moved. As a result, the invention realizes a much simpler and more reliable construction of the apparatus for conductive charging. The contacts are likewise nonmovably mounted in the housing of the robot part. For example, the contacts in the robot part and in the vehicle part are overmolded with a plastics material in regions for the purposes of being fixed in the respective housing, wherein, after the overmolding process, a partial region of the contacts remains free for the purposes of the contacting or connection of supply lines.

BRIEF DESCRIPTION OF THE DRAWING

An embodiment of the apparatus according to the invention and a method for operating this apparatus will be described below and discussed with reference to a drawing in which.

SPECIFIC DESCRIPTION OF THE INVENTION

Figure 1:
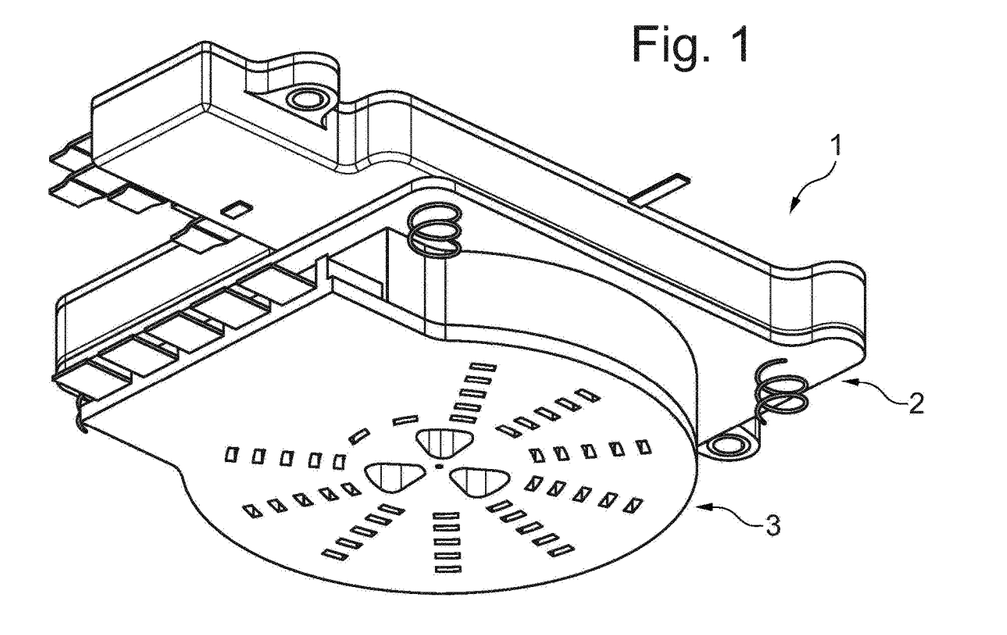
FIG. 1 is a perspective view from below of the interfitting vehicle and robot parts of this invention.

FIG. 1 shows the basic construction of an apparatus 1 according to the invention for conductive charging. A vehicle part 2 is illustrated that has a housing in which contact elements (not illustrated here) and possibly further functional components are arranged. This vehicle part 2 is arranged at a suitable location, in particular on an underbody, of an electric vehicle, which preferably moves autonomously. Furthermore, a so-called robot part 3 (FIG. 2) is provided, which likewise has a housing holding contact elements (likewise not illustrated here) and possibly also further functional components. These two parts 2, 3 are placed in operative connection in an approximately overlapping manner when the vehicle has arrived at a charging station at which the robot part 3 is present.

FIG. 1 shows that the robot part 3 is already in engagement with the vehicle part 2. Further means that are required for movement and position detection for the robot part 3 or the vehicle part 2 are present, but not illustrated.

Figure 2:
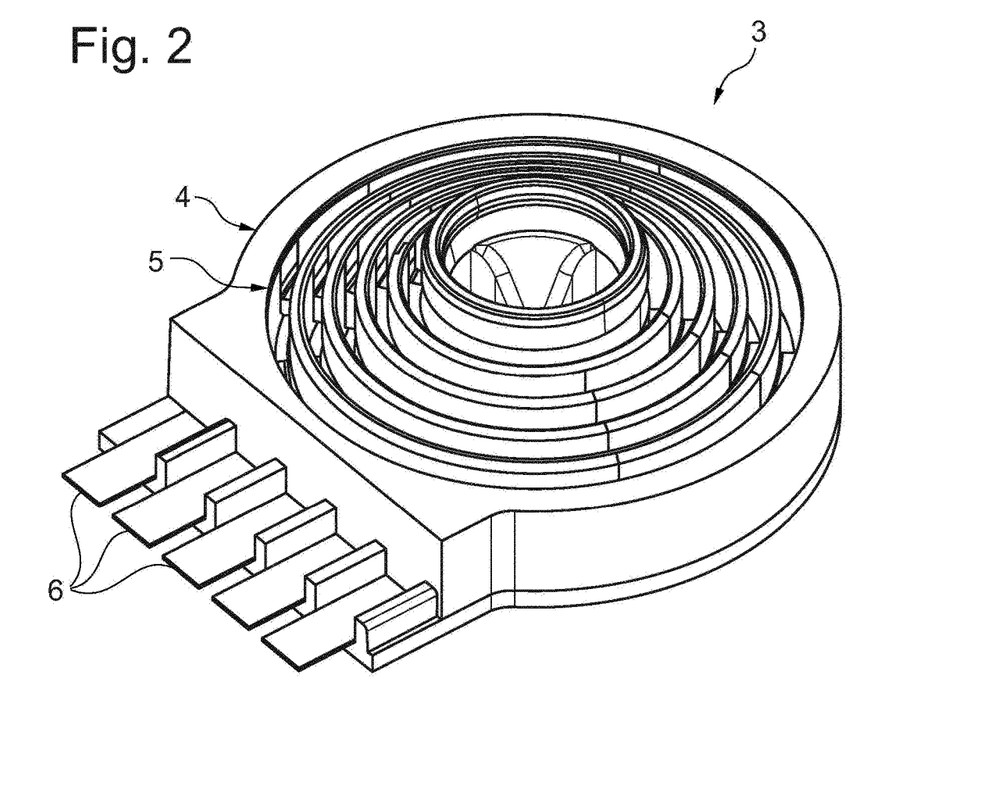
FIG. 2 is a perspective view from above of the robot part.

FIG. 2 shows the side of the robot part 3 pointing in the direction of the vehicle part 2. It can be seen that the robot part 3 has a housing 4, preferably composed of plastic. Provided in this plastics housing 4 is a conductor ring 5 (multiple conductor rings 5 are illustrated) that are connected to an energy source (not illustrated) for charging the vehicle. Each conductor ring 5 ends with a contact tab 6, which is provided, for example, for the purposes of contacting with a plug connector (not illustrated).

Figure 3:
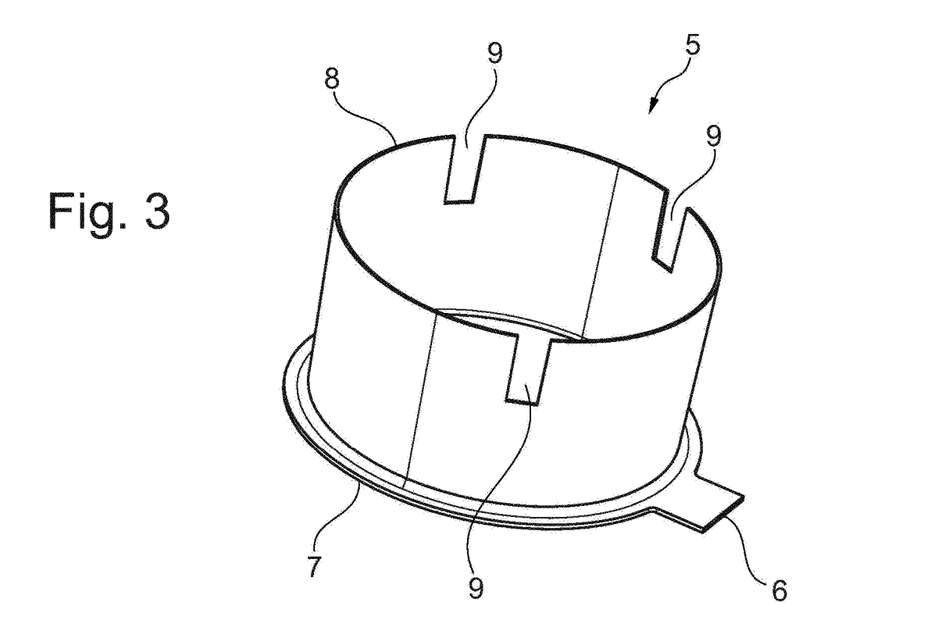
FIG. 3 is a perspective detail view of a conductor ring of the invention.

A conductor ring 5 is illustrated for example in FIG. 3. Such a conductor ring 5 is preferably implemented as a deep-drawn metal sheet that conducts the electrical current to the vehicle and that is arranged in a suitable position, and so as to be of a suitable size, in the housing 4 of the robot part 3. In this configuration, multiple conductor rings 5 are arranged concentrically one inside the other. Each conductor ring 5 has a base that is arranged at the encircling end of a cylindrical sleeve 8 and projects therefrom. Thus, the conductor ring 5 can be arranged, in particular fixed, in the housing 4 in a very effective manner. This applies in particular if a partial region of the cylindrical sleeve 8 together with the base 7 is surrounded by a plastics material that forms the housing 4. At least one recess 9 is provided over the circumference of the cylindrical sleeve 8. In this embodiment, exactly three recesses 9 are provided.

Figure 4:
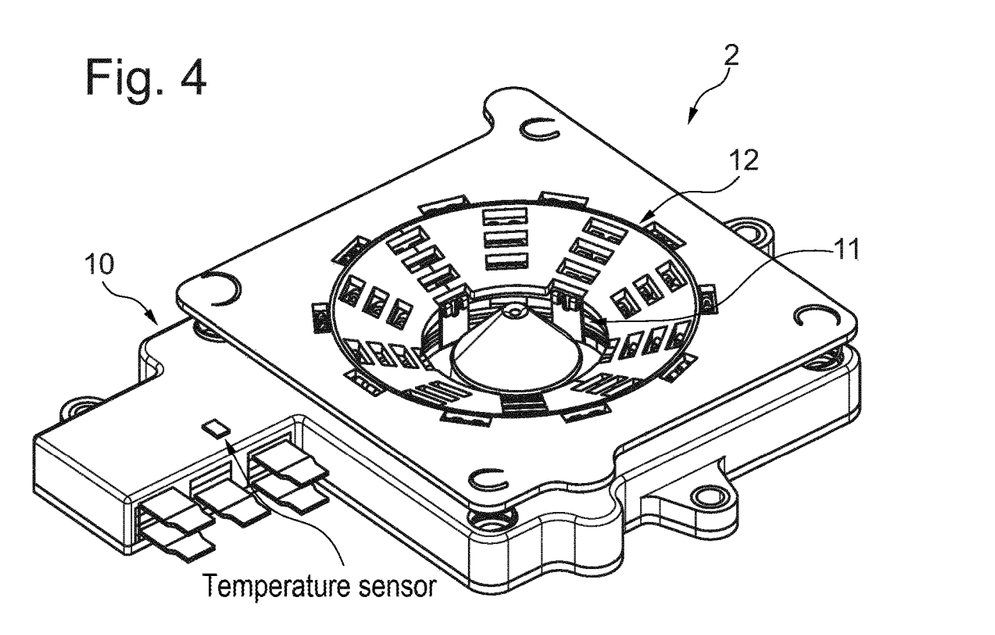
FIG. 4 is a perspective view of the vehicle part.

FIG. 4 shows the vehicle part 2, which is arranged with its underside (as viewed in FIG. 4) preferably on an underside of the vehicle (not illustrated). The vehicle part 2 also has a housing 10, preferably composed of plastic. Facing the top side (as viewed in FIG. 4) of the vehicle part 2 is a preferably plate-like engagement guard 12, which is arranged so as to be movable approximately plane-parallel with respect to the top side of the housing 10 of the vehicle part 2. The contacts 11 in the vehicle part 2, which are present but not yet fully visible here, are nonmovably mounted in the housing 10 of the vehicle part 2. For the corresponding contacts 11 in the vehicle part 2, cutouts are provided in the engagement guard 12, such that, when the engagement guard 12 is pressed together in the direction of the top of the vehicle part 2 by the robot part 3, the contacts 11 can pass through these cutouts and are thus exposed in order to be able to be applied to the contacts 5 in the robot part 3.

Figure 5:
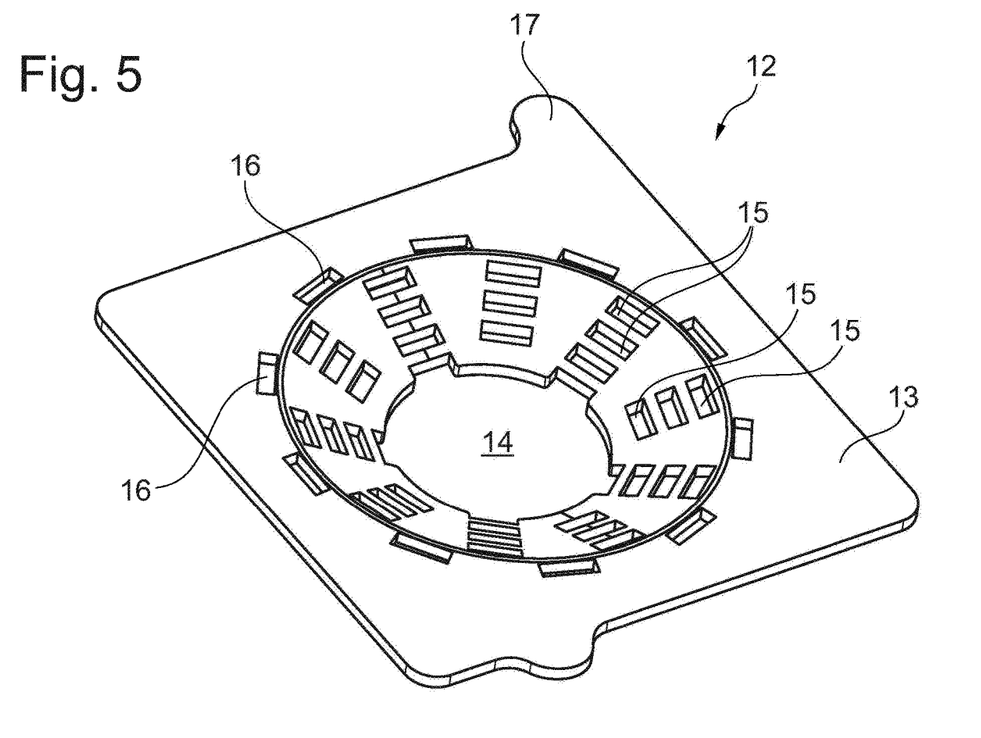
FIG. 5 is a perspective of the contact-guard plate of the vehicle part.

An exemplary configuration of the engagement guard 12 of areal form with the corresponding cutouts for the contacts 11 (spring contacts) is illustrated in FIG. 5. Such an engagement guard 12 may, like the housings 4, 10 of the two parts 2, 3, be produced for example in a plastics injection molding process. It is essential that the engagement guard 12 is movable relative to the vehicle part 2 in order to either protect or expose the contacts 11 in the housing 10 of the vehicle part 2, wherein the contacts 11 are nonmovably mounted in the housing 10 of the vehicle part 2.

It is furthermore evident and illustrated that the engagement guard 12 has a base 13 with a central opening 14. Provided around the central opening 14 is a region that runs obliquely with respect to the base 13 and in which multiple recesses 15 are arranged in encircling and also sloping fashion. The corresponding conductor springs 11 of the vehicle part 2 are passed through these recesses 15 and exposed when charging is to be performed, or are arranged under these recesses 15 when charging is not to be performed, such that the overall effect of the engagement guard 12 is that the conductor springs 11 are covered in the latter case. In addition, the engagement guard 12 also has, in encircling fashion, a plurality of recesses 16 through which further elements can be passed, for example in order to bring the vehicle part 2 and robot part 3 to one another in the correct position. In order to be able to install the engagement guard 12 in the correct position, it is furthermore possible for a coding lug 17 (or possibly further elements or also more than one coding lug) to be provided.

Figure 6:
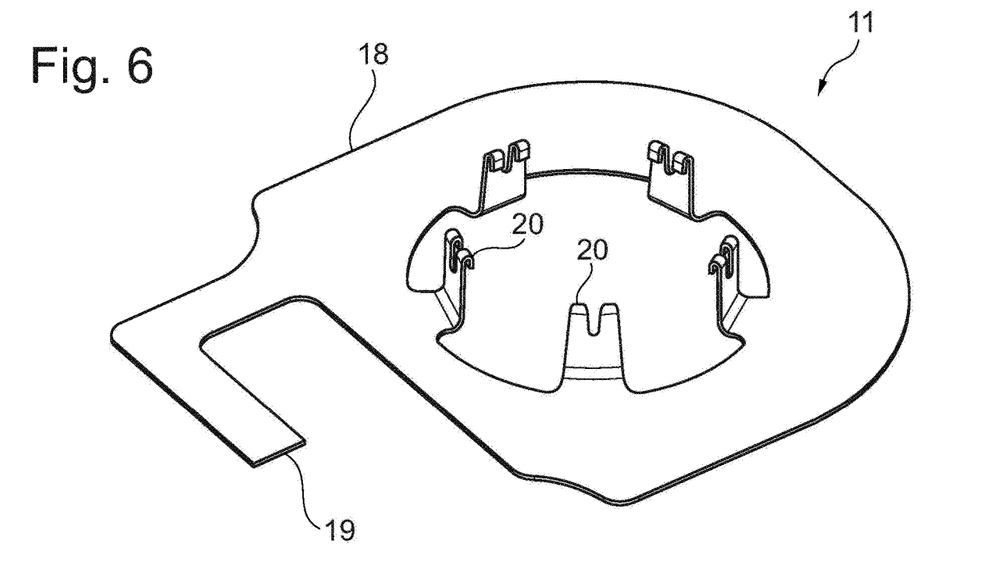
FIG. 6 is a perspective view of one of the contact plates of the vehicle part.

An exemplary configuration of a contact 11 (conductor spring) of the vehicle part 2 is illustrated in FIG. 6. This contact 11, illustrated by way of example, is in turn a deep-drawn metal sheet, which likewise conducts the electrical current to the vehicle. As the base 18, an outer ring can be seen, from which a contact tab projecting outwards (in turn for the connection of a plug connector (not illustrated)) and contacts 20 angled toward the inside extend upward, wherein these contacts 20 are either exposed or covered, for the purposes of protection against touching or contamination, by the engagement guard 12. If a plurality of such conductor springs 11 are arranged concentrically in the robot part or, in this case, the vehicle part 2, these vary in terms of their diameters.

Figure 7A:
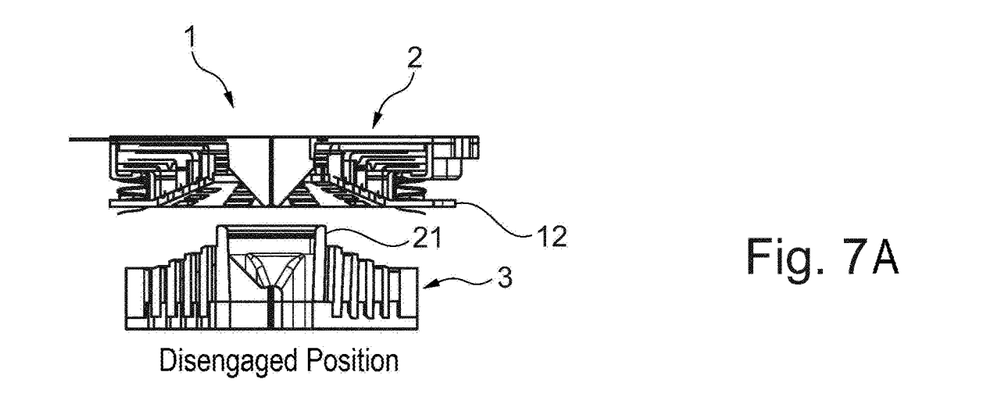
FIGS. 7A-7C illustrate the fitting together of the contacts of the vehicle and robot parts.
Figure 7B:
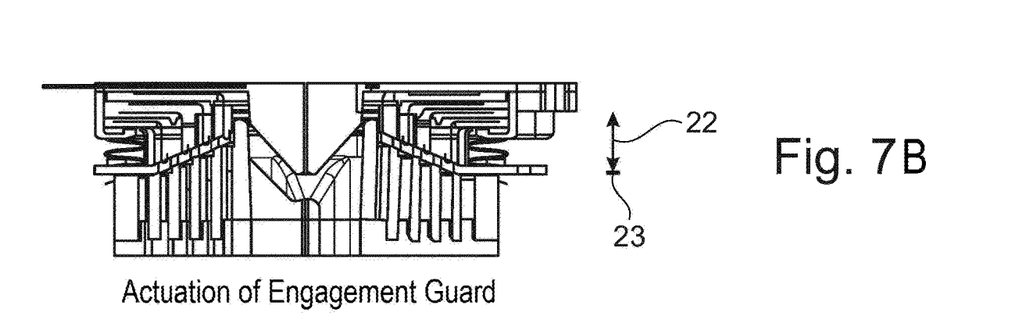

FIGS. 7A and 7B show the method for operating the two parts 2, 3 as described above and as shown in FIGS. 1 to 6.

In the illustration of FIG. 7A, it can be seen that, although the vehicle part 2 has already been brought into the region of the robot part 3, no contacting has yet been performed. This means that the robot part 3 first has to locate and set its exact position in relation to the vehicle part 2, for which purpose corresponding sensors and means for moving the robot part 3 are provided, but not illustrated.

The required overlap of the robot part 3 with the vehicle part 2 is illustrated, after having been achieved, in FIG. 7B. It can be seen here that the contact elements 11 in the vehicle part are still arranged within the housing 10 of the vehicle part 2 and are covered by the engagement guard 12. The engagement guard 12 is pressed in the direction of the housing 10 by the robot part 3 counter to the spring force, such that the contacts 11 in the vehicle part 2 are thus exposed by the engagement guard 12 in order that they can abut against the contacts 5 of the robot part 3. This operative connecting and thus contacting of the contacts 5, 11 of the two parts can be seen in FIG. 7C, such that the charging process can now take place.

In order that the vehicle part 2 and the robot part 3 can be brought together in a defined position relative to one another, the housing 4 of the robot part 3 has a dome 21 (FIG. 7A) that is passed through the central opening 14 of the engagement guard 12. Here, the dome 21 of the robot part 3 is guided by a corresponding counterpart element on the vehicle part 2, which is designed and suitable for entering into connection with the dome 21 and in so doing guiding the robot part 3 during the movement toward the vehicle part 2.

Figure 7C:
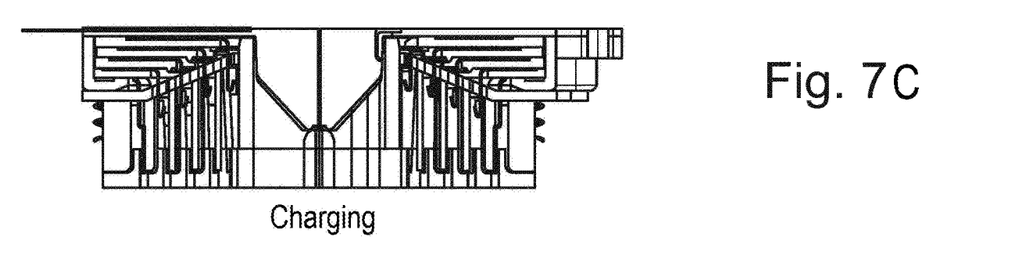

In FIG. 7B, it is also illustrated for the sake of clarity that the engagement guard 12 can be moved in a movement direction 22 from its initial position 23 and vice versa. The initial position 23 of the engagement guard 12 is a position in which the engagement guard 12 is arranged spaced apart from, and plane-parallel with respect to, a defined reference point (or reference surface) of the housing 10 of the vehicle part 2. The spacing in this initial position 23 between the engagement guard 12 and the housing 10 of the vehicle part 2 is defined and is implemented for example by means of a spring arranged between the engagement guard 12 and the housing 10 of the vehicle part 2, preferably multiple springs, in turn preferably at each corner of the preferably square engagement guard 12. This at least one spring is compressed in the movement direction 22 and the engagement guard 12 is moved in the direction of the defined point on the housing 10 of the vehicle part 2 when a defined point (or a defined surface) of the housing 4 of the robot part 3 moves toward the vehicle part 2. With further movement of the robot part 3 in the movement direction 22 toward the vehicle part 2, the engagement guard 12 is also moved further in the direction of the housing 10 of the vehicle part 2, and in the process the at least one spring is compressed such that the contacts 11 of the vehicle part 2 are exposed and can be placed in operative connection with the contacts 5 of the robot part 3. As already stated, this position of vehicle part 2 and robot part 3 relative to one another is illustrated in FIG. 7C.

It is self-evident that, after completion of the charging process, the two parts 2, 3 are separated from one another again in the reverse procedure, wherein the contacts 11 that are static in the housing 10 of the vehicle part 2 are again covered by the engagement guard 12 after the robot part 3 has been removed from the vehicle part 2.

FIGS. 8A to 13B show particularly advantageous configurations of the contacts 5, in particular of the vehicle part 2, and of the contacts 11, in particular of the robot part 3. In the case of multiple contacts 5 or contacts 11, the coaxial arrangement is retained in this embodiment, although other arrangements are generally also conceivable.

Figure 8A:
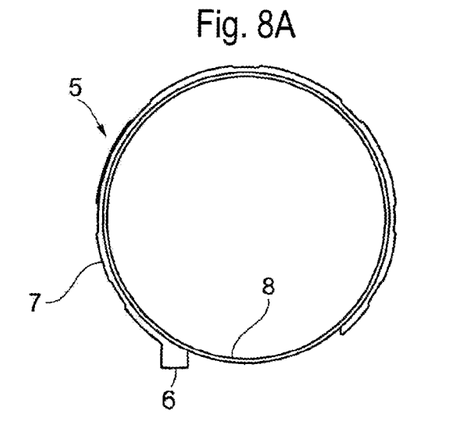
FIGS. 8A-8C, FIGS. 9A-9B, FIGS. 10A-10B, FIGS. 11A-11B, FIGS. 12A-12B, and FIGS. 13A-B show six different contact systems of this invention.
Figure 8B:
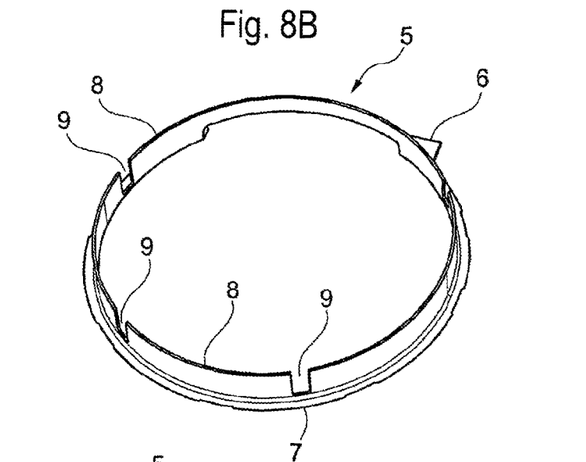
Figure 8C:
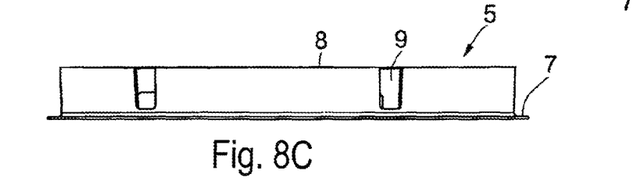

FIGS. 8A to 8C illustrate how the at least one contact 5 of the robot part 3 has a base 7 from which a cylindrical sleeve 8 and a contact tab 6 extend. It can also be seen that the cylindrical sleeve 8 has at least one recess 9, preferably multiple recesses 9 arranged around the circumference of the cylindrical sleeve 8. The cylindrical sleeve 8 increases the stiffness of this contact 5, in particular if the cylindrical sleeve 8 projects exactly perpendicularly or approximately perpendicularly from the base 7. With the base 7, the respective contact 5 can be arranged very effectively in the housing 4, in particular on the base of the housing 4, of the robot part 3. Preferably, the base 7 is fixed in the housing 4 if the housing 4 is composed of plastic and is produced in a plastics injection-molding process.

Figure 9A:
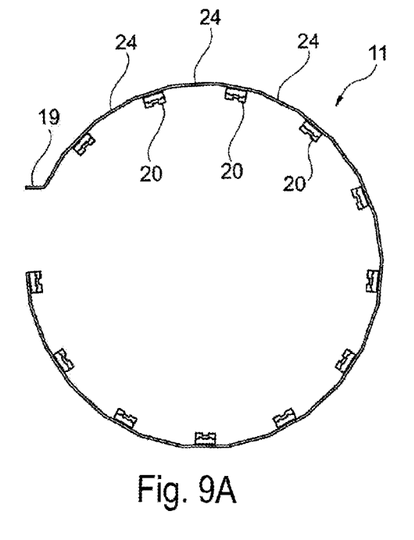
Figure 9B:
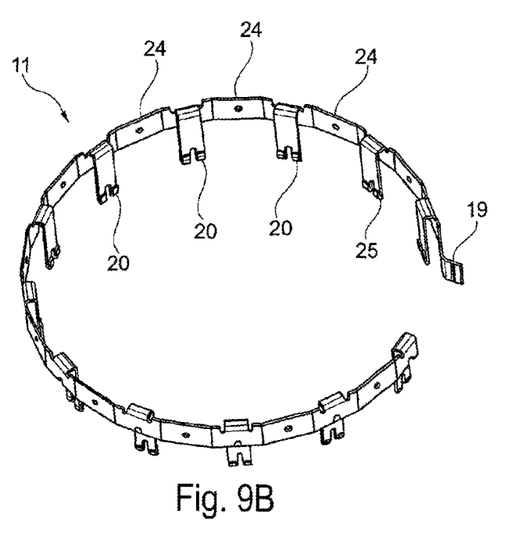

FIGS. 9A and 8B show how the at least one contact 11 of the vehicle part 2 has a base 18 from which at least one contact spring 20 and a contact tab 19 extend. In the case of the contact 11 according to this embodiment, the base 18 of the contact 11 is formed by multiple base sections 24 arranged around the circumference, wherein a contact spring 20 projects perpendicularly between in each case two base sections 24. As an alternative or in addition, the base sections 24 may also be oriented so as to be angled, preferably by exactly 90 degrees, with respect to the contact springs 20. It is also illustrated that the contact spring 20 has an angled portion 25 at its free end.

Figure 10A:
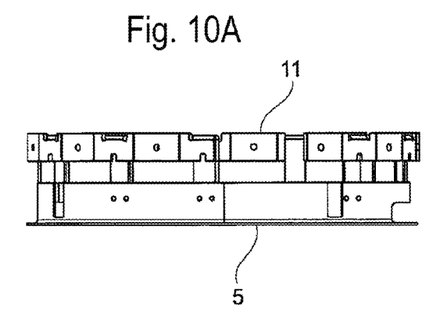
Figure 10B:
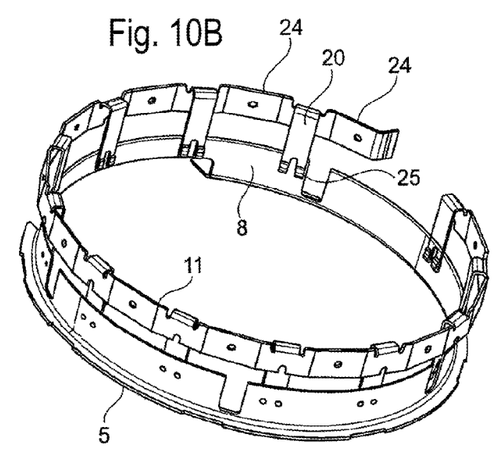
Figure 11A:
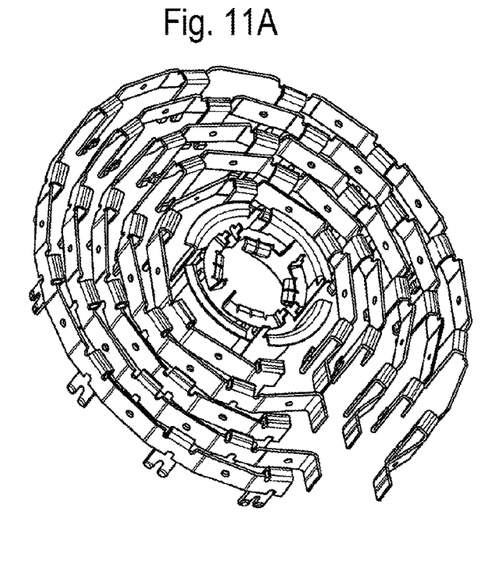
Figure 11B:
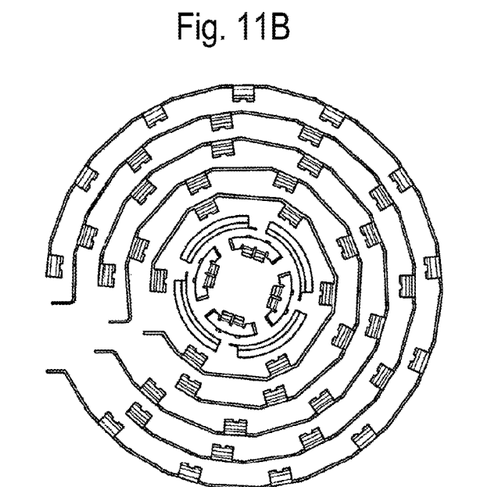
Figure 12A:
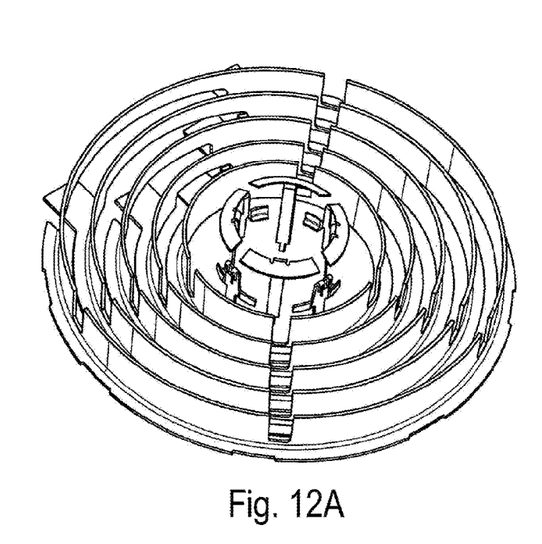
Figure 12B:
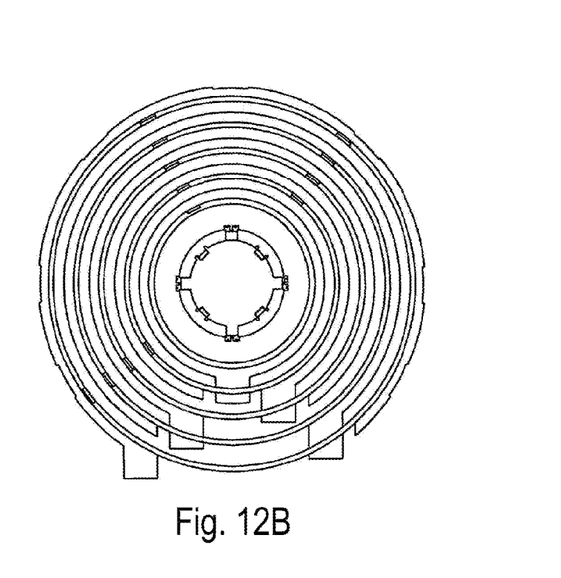
Figure 13A:
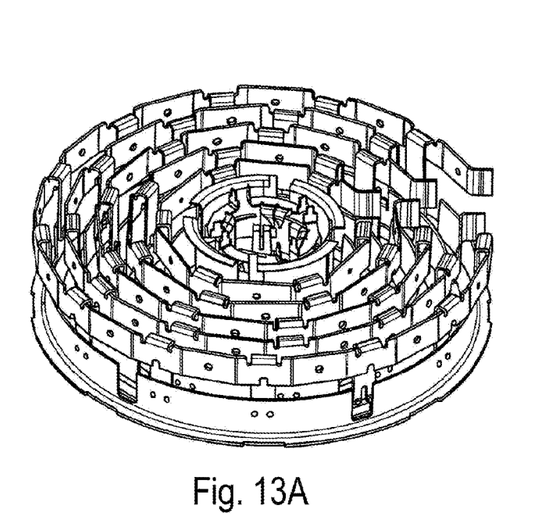
Figure 13B:
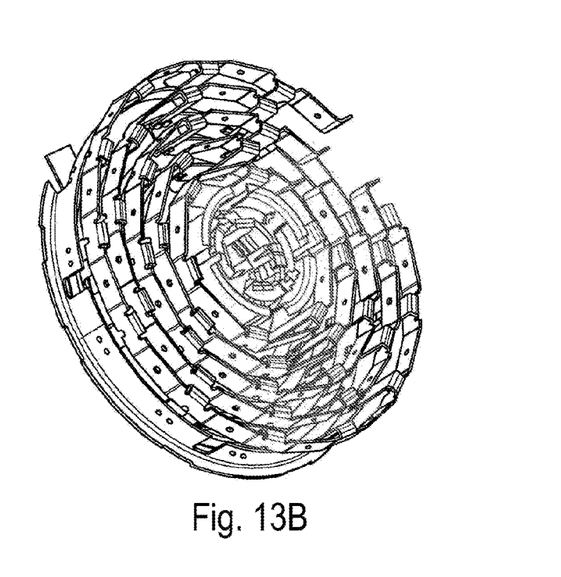

FIGS. 10A and 10B show how a respective contact 5 has been brought into operative connection with its respective contact 11 after the robot part 3 has been brought together with the vehicle part 2 by means of the corresponding centering process. Above all, it can be seen that the respective contact spring 20 has, in particular by way of its free end region, in which furthermore in particular the angled portion 25 is situated, of the contact 11, been brought together with the cylindrical sleeve 8 of the contact 5. It is pointed out here that the respective contact spring 20 has come to lie against the contact 5 in a region of the cylindrical sleeve 8 adjacent to the recess 9.

Viewing FIGS. 10A and 10B, for example, it is also pointed out that the base section 24 is produced in the form of a strip in a stamping-bending process and, separately from this, the respective contact spring 20 is likewise produced in a stamping-bending process. After the contact springs 20 have been produced separately, they are, by way of their end averted from the angled portion 25, fixed to the base sections 24 by a bending process, a calking process or the like. This is preferably performed by way of a force fit, though may also alternatively or additionally be performed by way of a form fit (for example brazing, welding, adhesive bonding using an electrically conductive adhesive, and the like).

Finally, FIGS. 11A to 13B show once again three variations of the coaxial arrangement of the contacts 5, 11, where centering means are provided in the middle of this coaxial arrangement.

The invention claimed is:

1. An apparatus for conductive charging, the apparatus comprising:

a vehicle part fixed on a vehicle;
a fixed robot part movable relative to the vehicle part, the vehicle part being fittable with the robot part for the purposes of charging, the vehicle and robot parts having respective vehicle and robot housings;
respective sets of vehicle and robot contacts in the robot and vehicle housings, the robot contacts in the robot part being recessed in the robot housing and the vehicle contacts being nonmovably mounted in the vehicle housing;
a robot base carrying at least one of the robot contacts of the robot part;
a cylindrical sleeve;
a contact tab extending from the robot base;
a vehicle base carrying at least one of the contacts of the vehicle part and formed by a plurality of base sections surrounding the sleeve; and
at least one contact spring extending from between two of the base sections of the vehicle base.

2. The apparatus for conductive charging according to claim 1, wherein the cylindrical sleeve has multiple recesses arranged around the circumference of the cylindrical sleeve.

3. The apparatus for conductive charging according to claim 1, wherein the contact spring has an angled portion at its free end.

4. The apparatus for conductive charging according to claim 1, further comprising:

an engagement guard on the vehicle part that is movable relative to the housing of the vehicle part and that protects or exposes the contacts of the vehicle part.

5. The apparatus for conductive charging according claim 4, further comprising:

springs supporting the engagement guard on the housing of the vehicle part.

6. The apparatus for conductive charging according to claim 1, wherein the contact elements of the robot part are recessed in the housing so as to be protected against external touching or contamination, but are accessible to the contact elements of the vehicle part.

7. The apparatus for conductive charging according to claim 1, wherein the engagement guard covers contact elements of the vehicle part such that the contact elements of the vehicle part are not accessible for as long as no charging is being performed and for as long as the vehicle part has not been placed in operative connection with the robot part, and only when the robot part is moved in the direction of the vehicle part is this engagement guard moved relative to the housing of the vehicle part by the robot part such that the contact elements of the vehicle part, which are nonmovably mounted in the housing of the vehicle part, are exposed and can engage into corresponding free spaces in the robot part in order to touch and thus make contact with the contact elements situated there of the robot part.

8. The apparatus for conductive charging according to claim 7, wherein the contacts in the robot part or the contacts of the vehicle part are overmolded with a plastics material in regions for the purposes of being fixed in the respective housing of the robot part and/or of the vehicle part.

* * * * *